United States Patent [19]

Kamrud, Sr.

[11] Patent Number: 4,676,472

[45] Date of Patent: Jun. 30, 1987

[54] HIGH VOLTAGE TUBING CONDUCTOR HOLDING DEVICE

[75] Inventor: Robert A. Kamrud, Sr., Chanhassen, Minn.

[73] Assignee: Gerald Lapides, Golden Valley, Minn.

[21] Appl. No.: 806,660

[22] Filed: Dec. 9, 1985

[51] Int. Cl.⁴ .............................................. F16L 3/08
[52] U.S. Cl. .................... 248/542; 248/544; 248/68.1; 248/70; 248/74.4; 248/74.1; 248/278
[58] Field of Search ................. 248/544–549, 248/51, 62, 63, 67.7, 68.1, 70, 73, 74.1, 74.4, 82, 84, 86, 88, 278, 281.1, 289.1, 324, 231.6, 316.1, 316.6, 231.5, 316.5, 542

[56] References Cited

U.S. PATENT DOCUMENTS

| | | | |
|---|---|---|---|
| 724,782 | 4/1903 | Becker | 248/278 |
| 865,184 | 9/1907 | Kenlon | 248/86 |
| 1,323,127 | 11/1919 | Treuthardt . | |
| 1,598,507 | 8/1926 | Plummer | 248/70 |
| 1,627,288 | 5/1927 | Kurkowski . | |
| 1,667,342 | 4/1928 | Blau | 248/82 |
| 1,894,835 | 1/1933 | Smith . | |
| 2,149,875 | 3/1939 | Talbott | 248/63 |
| 2,419,860 | 4/1947 | Urrutia | 248/70 |
| 3,863,911 | 2/1975 | McWilliams . | |
| 4,125,237 | 11/1978 | Hagins | 248/49 |
| 4,553,724 | 11/1985 | St.-Amand | 248/68.1 |

FOREIGN PATENT DOCUMENTS 634481 2/1978 France .................................. 248/70

*Primary Examiner*—Reinaldo P. Machado
*Assistant Examiner*—Alvin Chin-Shue
*Attorney, Agent, or Firm*—Peterson, Wicks, Nemer & Kamrath

[57] ABSTRACT

A device for holding high voltage tubing conductors in position to allow their attachment is shown according to the teachings of the present invention as including first and second L-shaped bracket arms which are positionable in one of a plurality of angular positions by a hinge assembly interconnected to the free ends of their first legs. First and second shoes are further provided which are positionable in one of a plurality of angular positions with respect to the second legs of the bracket arms by a hinge assembly interconnected therebetween. A first high voltage tubing conductor may be positioned with respect to a second high voltage tubing conductor to allow their attachment by fixing the first and second shoes and the bracket arms in the desired angular positions and by releasably securing the first and second shoes to the first and second high voltage tubing conductors.

16 Claims, 4 Drawing Figures

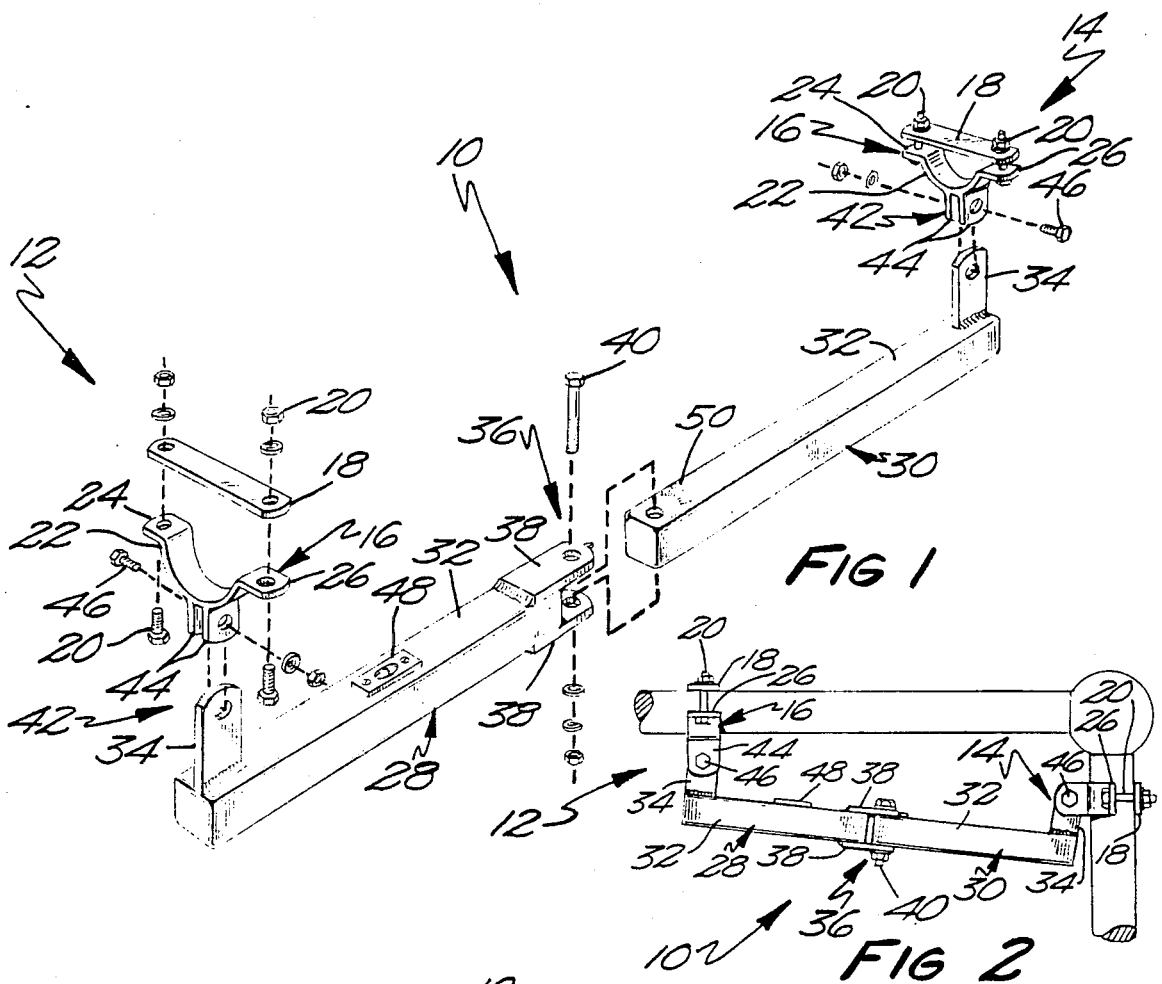
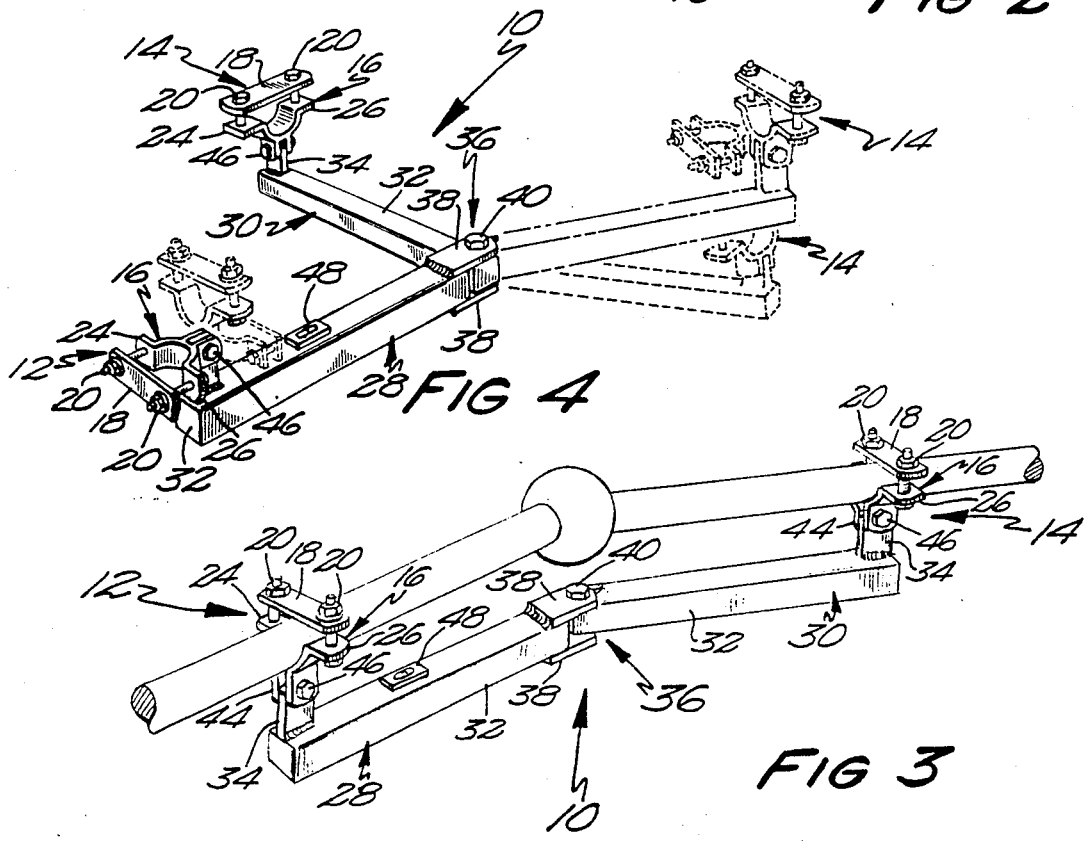

HIGH VOLTAGE TUBING CONDUCTOR HOLDING DEVICE

BACKGROUND

The present invention relates generally to a device for holding high voltage tubing conductors in position to allow their attachment.

During the installation of high voltage switches, brakers, transformers, and the like in substations and like electrical installations, it is necessary to keep minimum clearance between the high voltage tubing conductors. Especially in the replacement or addition of electrical equipment in existing electrical installations or substations, it is necessary to custom build the high voltage tubing conductors to keep this minimum clearance. Prior to the present invention, two people were required to install such high voltage tubing conductors where a crane was typically utilized for at least one of the installers, with one installer holding each end of the high voltage tubing conductor. It can then be realized that such installation was relatively expensive since two people were required rather than a single person and since the use of a crane was required. Furthermore, the use of a crane can be very dangerous due to its possible contact with high voltage. Therefore, a need has arisen for a device for holding high voltage tubing conductors in position to allow their attachment which requires only one installer and which does not require the use of a crane.

SUMMARY

The present invention solves this and other needs and problems in the installation of high voltage tubing conductors by providing in its most preferred form a holding device including first and second bracket arms which may be attached by the ends of their first legs in one of a plurality of angular positions. The holding device further includes first and second shoes which are releasably secured to high voltage tubing conductors and which are attachable to the ends of second legs of the first and second bracket arms in one of a plurality of angular positions. The axis of the bracket arm angular positions is spaced from the second legs of the bracket arms and perpendicular with the first legs of the bracket arms. The axis of the shoe angular positions is generally perpendicular with a plane defined by the first and second legs of the bracket arms and generally perpendicular to the bracket arm axis.

The present invention solves this and other needs and problems in the installation of high voltage tubing conductors by providing a unique method of installation utilizing a holding device which positions the high voltage tubing conductors with respect to each other to allow their attachment.

It is thus an object of the present invention to provide a novel device for holding high voltage tubing conductors in position to allow their attachment.

It is thus an object of the present invention to provide a novel method of attaching high voltage tubing conductors in a substation or like electrical installation.

It is further an object of the present invention to provide such a novel attachment of high voltage tubing conductors which does not require two installers but rather allows attachment by a single installer.

It is further an object of the present invention to provide such a novel attachment of high voltage tubing conductors which does not require the use of a crane.

It is further an object of the present invention to provide such a novel high voltage tubing conductor holding device which is lightweight for ease of handling.

It is further an object of the present invention to provide such a novel high voltage tubing conductor holding device which holds high voltage tubing conductors at precise angular positions.

It is further an object of the present invention to provide such a novel high voltage tubing conductor holding device which is durable.

It is further an object of the present invention to provide such a novel high voltage tubing conductor holding device which may be easily utilized and which is workable.

It is further an object of the present invention to provide such a novel high voltage tubing conductor holding device which accurately aligns, levels, and holds high voltage tubing conductors in place while the necessary weld attachments are made.

It is further an object of the present invention to provide such a novel high voltage tubing conductor holding device which is relatively inexpensive to manufacture and fabricate.

It is further an object of the present invention to provide such a novel high voltage tubing conductor holding device which is of a relatively uncomplicated design.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows an exploded perspective view of a device for holding high voltage tubing conductors in position to allow their attachment according to the preferred teachings of the present invention.

FIGS. 2 and 3 show views of the high voltage tubing conductor holding device of FIG. 1 in use.

FIG. 4 shows a perspective view of the high voltage tubing conductor holding device of FIG. 1 illustrating alternate positions of the bracket arms and shoes thereof in phantom and dotted lines.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "upper", "lower", "first", "second", and similar terms are used herein, it should be understood that these terms have reference only to the structure shown in the drawings as it would appear to a person viewing the drawings and are utilized only to facilitate describing the invention.

DESCRIPTION

A high voltage bus holding device according to the teachings of the present invention is generally shown in the drawings and designated 10. Holding device 10 according to the teachings of the present invention generally includes first and second shoes 12 and 14 for releasable securement to high voltage tubing conductors or buses. In their most preferred form, shoes 12 and 14 include a first clamp member 16 removeably interconnected to a second clamp member 18 by bolts 20. In its most preferred form, clamp member 16 includes a generally C-shaped portion 22 having first and second ends and a diameter generally equal to but slightly larger than the high voltage bus to be held. Clamp member 16 further includes ears 24 and 26 extending along a line in opposite directions from the first and second ends of C-shaped portion 22, respectively. In its most preferred form, second clamp member 18 is planar and has a generally rectangular shape. Bolts 20 extend through second clamp member 18 and ears 24 and 26 of first clamp member 16.

Holding device 10 according to the teachings of the present invention further includes first and second bracket arms 28 and 30. Bracket arms 28 and 30 in their most preferred form are generally L-shaped and include a first leg 32 and a second leg 34 interconnected substantially at right angles by their first ends. In the most preferred form, legs 32 are formed of pipe having an outside diameter of 1½ inches. Legs 34 in the most preferred form are formed from plates and have a length above legs 32 of 4½ inches.

Holding device 10 according to the teachings of the present invention further includes member 36 for attaching the second ends of legs 32 together with legs 32 of bracket arms 28 and 30 being in one of a plurality of angular positions. The bracket arm axis of the angular positions of legs 32 of bracket arms 28 and 30 is spaced from legs 34 of bracket arms 28 and 30 and parallel with planes extending through legs 32 and 34 of bracket arms 28 and 30. In its most preferred form, member 36 is shown as a hinge assembly for hingedly mounting bracket arms 28 and 30 together and specifically for hingedly mounting the second ends of legs 32 together. In its most preferred form, member 36 is formed by plates 38 secured on opposite sides of leg 32 of bracket arm 28 and extending beyond its second end and by a bolt 40 which extends through plates 38 spaced from the second end of leg 32 of bracket arm 28 and through the second end of leg 32 of bracket arm 30. Thus, bracket arms 28 and 30 may be pivoted with respect to each other by loosening bolt 40 and rotating bracket arms 28 and 30 with respect to each other about bolt 40 and bracket arms 28 and 30 may be fixed in one of the plurality of angular positions illustrated in FIG. 4 by tightening bolt 40 and preventing movement of first and second bracket arms 28 and 30.

Holding device 10 according to the teachings of the present invention further includes first and second members 42 for attaching shoes 12 and 14 to the second ends of legs 34 of bracket arms 28 and 30 in one of a plurality of angular positions. The shoe axis of the angular positions of shoes 12 and 14 is generally perpendicular with a plane defined by legs 32 and 34 of bracket arms 28 and 30. In its most preferred form, member 42 is formed by a hinge assembly for hingedly mounting shoes 12 and 14 to the second ends of legs 34 of bracket arms 28 and 30, respectively. In its most preferred form, members 42 are formed by plates 44 extending from the center of C-shaped portion 22 generally perpendicular to and in a direction opposite to ears 24 and 26 and on opposite sides of legs 34 and by a bolt 46 which extends through plates 44 and leg 34 of bracket arms 28 and 30. Thus, shoes 12 and 14 may be pivoted by loosening bolt 46 and rotating shoes 12 and 14 with respect to second legs 34 of bracket arms 28 and 30 about bolt 46 and shoes 12 and 14 may be fixed in one of the plurality of angular positions illustrated in FIG. 4 by tightening bolt 46 and preventing movement of shoes 12 and 14 with respect to second legs 34 of bracket arms 28 and 30.

In its most preferred form, holding device 10 according to the teachings of the present invention further includes a level 48 secured to bracket arm 28 for determining whether legs 32 of bracket arms 28 and 30 lie in a horizontal plane. Further, in its most preferred form, a protractor 50 is provided adjacent the second ends of legs 32 of bracket arms 28 and 30 for determining the angle between legs 32 of bracket arms 28 and 30 according to the teachings of the present invention.

Now that the construction of holding device 10 according to the preferred embodiment of the teachings of the present invention has been set forth, the use and subtle features of holding device 10 can be set forth and appreciated. For example, if it is desired to attach a first high voltage tubing conductor between existing second and third high voltage tubing conductors, one possible method of attachment would be to secure a sphere ball to the end of the second high voltage tubing conductor. Shoes 12 and 14 may then be positioned at their desired angular position by loosening bolts 46, pivoting shoes 12 and 14 about bolts 46 to the desired angular position with respect to legs 34, and by tightening bolt 46 fixing shoes 12 and 14 in that angular position. Bracket arms 28 and 30 may also be positioned at its desired angular position by loosening bolt 40, pivoting bracket arms 28 and 30 about bolt 40 to the desired angular position with respect to each other, and by tightening bolt 40 fixing bracket arms 28 and 30 in that angular position. Shoe 12 of holding device 10 can then be secured to the second high voltage tubing conductor by sandwiching the second high voltage tubing conductor between clamp members 16 and 18 with bolts 20. The first high voltage tubing conductor may then be positioned to abut with the sphere ball of the second high voltage tubing conductor and may be secured within shoe 14 of holding device 10 according to the teachings of the present invention. It can then be realized that holding device 10 according to the teachings of the present invention positions the first and second high voltage tubing conductors together to allow their attachment at that time or at a later time. The third high voltage tubing conductor may then be cut to the desired length and the sphere ball may be positioned to allow attachment of the first and third high voltage tubing conductors. It can then be realized that a second holding device 10 according to the teachings of the present invention may be utilized for holding the first high voltage tubing conductor with respect to the third high voltage tubing conductor to allow their attachment in a similar manner as set forth for the first holding device 10 holding the first and second high voltage tubing conductors in position to allow their attachment.

It can then be appreciated that holding device 10 according to the teachings of the present invention is advantageous over prior high voltage tubing conductor attachment methods. Specifically, holding device 10 according to the teachings of the present invention allows the high voltage tubing conductors to be accurately aligned, leveled, and held in place while the necessary attachment welds are being made. Further, its use saves many man hours due to the simplified high voltage tubing conductor installation made possible by holding device 10 according to the teachings of the present invention and the elimination of the requirement of two installers. Furthermore, since the angular positions of shoes 12 and 14 with respect to legs 34 of bracket arms 28 and 30 and the angular positions of bracket arms 28 and 30 with respect to each may be fixed in holding device 10 according to the teachings of the present invention and may be easily and rapidly determined and measured, high voltage tubing conductors may be attached together with more precise angles than heretofor possible. Additionally, holding device 10 according to the teachings of the present invention removes the necessity of the use of a crane and thus further reduces the cost of installation as well as removes an extremely dangerous source of electrocution.

Furthermore, it is believed that the most preferred construction of holding device 10 according to the teachings of the present invention as shown and described is believed to be particularly advantageous. Specifically, holding device 10 according to the teachings of the present invention maybe formed of fiberglass or similar non-conductive material which then is safer in high voltage environments of the present invention. Furthermore, this preferred construction of holding device 10 is extremely durable for extended use. Further, this preferred construction is relatively lightweight allowing for ease of handling by a single installer. Bracket arms 28 and 30 according to the teachings of the present invention are formed from pipe and plate material and together with bolts 20, 40, and 46 are readily available. Similarly, shoes 12 and 14 and hinge assemblies 36 and 42 according to the teachings of the present invention are easily fabricated. Thus, holding device 10 according to the teachings of the present invention is relatively inexpensive to manufacture and fabricate.

Holding device 10 according to the teachings of the present invention is further advantageous over prior high voltage tubing conductor installation methods due to its ease of use and its workability. Specifically, holding device 10 constructed according to the teachings of the present invention is of relatively uncomplicated design which is easily set up and secured to the high voltage tubing conductors such that installers will readily utilize holding device 10 rather than utilize prior high voltage tubing conductor attachment methods.

FIGS. 2 and 3 of the drawings generally illustrate holding device 10 according to the teachings of the present invention for holding high voltage tubing conductors in different positions and show its flexibility and ease of use. For example, FIG. 3 shows one method of utilizing holding device 10 according to the teachings of the present invention to hold a first high voltage tubing conductor at a 15° angle from an in-line condition in a horizontal plane with respect to a second high voltage tubing conductor. Specifically, shoes 12 and 14 may be fixed in the angular position such that the high voltage tubing conductors are generally perpendicular to legs 34 and generally parallel to legs 32 of bracket arms 28 and 30 and with the bracket arms 28 and 30 being fixed in a 165° angular relationship with each other. Likewise, FIG. 2 shows one method of utilizing holding device 10 according to the teachings of the present invention to hold a first, horizontal, high voltage tubing conductor with a second, vertical, high voltage tubing conductors. Specifically, bracket arms 28 and 30 may be fixed in a straight position, with shoe 12 being fixed in an angular position such that the first high voltage tubing conductor is generally perpendicular to leg 34 and generally parallel to leg 32 of bracket arm 28 and with shoe 14 being fixed in an angular position such that the second high voltage tubing conductor is generally parallel to leg 34 and generally perpendicular to leg 32 of bracket arm 30.

It can then be realized that holding device 10 according to the teachings of the present invention is extremely workable and useable in the custom installation of high voltage tubing conductors in substation or similar electrical installations. The examples of the utilization of holding device 10 according to the teachings of the present invention are exemplary only and other methods of utilization will become known after the teachings of the present invention become known.

Now that the basic teachings of the present invention have been explained, many extension and variations will be obvious to one having ordinary skill in the art. For example, the construction of shoes 12 and 14 as shown and described is believed to be particularly advantageous, however, other types of shoes for the releasable securement of high voltage tubing conductors may be utilized according to the teachings of the present invention. Similarly, the preferred construction of bracket arms 28 and 30 and hinge assemblies 36 and 42 are believed to be advantageous but may have other shapes and forms according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device for holding a first high voltage tubing conductor in position with respect to a second high voltage tubing conductor to allow their attachment comprising, in combination: a first shoe for releasable securement to the first high voltage tubing conductor; a second shoe for releasable securement to the second high voltage tubing conductor; a first, generally L-shaped bracket arm including a first leg having a first end and a second end and a second leg having a first end and a second end, with the first ends of the first and second legs of the first bracket arm being interconnected generally perpendicular to each other; a second, generally L-shaped bracket arm including a first leg having a first end and a second end and a second leg having a first end and a second end, with the first ends of the first and second legs of the second bracket arm being interconnected generally perpendicular to each other; a hinge assembly for attaching the second ends of the first legs of the first and second bracket arms together with the first legs of the first and second bracket arms fixed in one of a plurality of angular positions between 90° and 270°, with the bracket arm hinge assembly including a bolt forming a bracket arm pivot axis, wherein the bracket arms may be pivoted with respect to each other by loosening the bolt and rotating the bracket arms with respect to each other about the bolt and the first and second bracket arms may be fixed in one of the plurality of angular positions by tightening the bolt and preventing movement of the first and second bracket arms with respect to each other, with the hinge assembly attaching the first and second bracket arms together in a generally U-shaped configuration, with the bracket arm axis of the angular positions of the first legs of the first and second bracket arms being spaced from the second legs of the first and second bracket arms, and parallel to planes defined by the first and second legs of the first and second bracket arms; first and second hinge assemblies for attaching the first and second shoes with the second ends of the second legs of the first and second bracket arms in one of a plurality of angular positions, with the shoe hinge assembly including a bolt forming the shoe axis, wherein the shoe may be pivoted by loosening the bolt and rotating the shoe with respect to the second leg of the bracket arm about the bolt and the shoe may be fixed in one of the plurality of angular positions by tightening the bolt and preventing movement of the shoe with respect to the second leg of the bracket arm, with the shoe axis of the angular positions of the first and second shoes being generally perpendicular with the planes defined by the first and second legs of the first and second bracket arms.

2. The high voltage tubing conductor holding device of claim 1 wherein the hinge assembly comprises, in combination: at least one plate extending from the C-shaped portion intermediate and in the opposite direction from its first and second ends, with the plate being parallel to and between the first and second ears, with the bolt extending through the plate and the second leg of the bracket arms.

3. The high voltage tubing conductor holding device of claim 1 wherein the first and second shoes comprise, in combination: a first clamp member; a second clamp member; and means for removeably interconnecting the first and second clamp members together with the high voltage tubing conductor sandwiched therebetween.

4. The high voltage tubing conductor holding device of claim 3 wherein the first clamp member comprises, in combination: a generally C-shaped portion having a first end and a second end and having a diameter sufficient for receipt on the high voltage tubing conductor; first and second ears extending from the first and second ends of the C-shaped portion in opposite directions and along a straight line; and wherein the removeably interconnecting means comprises, in combination: bolts extending through the second clamp member and the first and second ears of the first clamp member.

5. Device for holding a first high voltage tubing conductor in position with respect to a second high voltage tubing conductor to allow their attachment comprising, in combination: a first shoe for releasable securement to the first high voltage tubing conductor; a second shoe for releasable securement to the second high voltage tubing conductor; a first bracket arm including a first leg having a first end and a second end and a second leg having a first end and a second end, with the first ends of the first and second legs of the first bracket arm being interconnected; a second bracket arm including a first leg having a first end and a second end and a second leg having a first end and a second end, with the first ends of the first and second legs of the second bracket arm being interconnected; means for attaching the second ends of the first legs of the first and second bracket arms together with the first legs of the first and second bracket arms fixed in one of a plurality of angular positions between 90° and 270°, with the attaching means attaching the first and second bracket arms together in a generally U-shaped configuration, with the bracket arm axis of the angular positions of the first legs of the first and second bracket arms being spaced from the second legs of the first and second bracket arms and parallel to planes defined by the first and second legs of the first and second bracket arms; first and second means for attaching the first and second shoes with the second ends of the second legs of the first and second bracket arms in one of a plurality of angular positions, with the shoe axis of the angular positions of the first and second shoes being generally perpendicular with the planes defined by the first and second legs of the first and second bracket arms and generally perpendicular with the bracket arm axis.

6. The high voltage tubing conductor holding device of claim 5 wherein the first and second bracket arms have a generally L-shape, with the first and second legs of the bracket arms being generally perpendicular to each other.

7. The high voltage tubing conductor holding device of claim 5 wherein the bracket arm attaching means comprises, in combination: a hinge assembly formed on the second ends of the first legs of the first and second bracket arms, with the hinge assembly including a bolt forming the bracket arm axis, wherein the bracket arms may be pivoted with respect to each other by loosening the bolt and rotating the bracket arms with respect to each other about the bolt and the first and second bracket arms may be fixed in one of the plurality of angular positions by tightening the bolt and preventing movement of the first and second bracket arms with respect to each other.

8. The high voltage tubing conductor holding device of claim 5 further comprising, in combination: a level secured to the first leg of the first bracket arm for determining if the first legs of the first and second bracket arms lie in a horizontal plane.

9. The high voltage tubing conductor holding device of claim 5 further comprising, in combination: a protractor provided adjacent the second ends of the first legs of the first and second bracket arms for determining the angle between the first legs of the first and second bracket arms.

10. The high voltage tubing conductor holding device of claim 5 wherein the first legs of the bracket arms are formed from pipe and wherein the second legs of the bracket arms are formed from plates.

11. The high voltage tubing conductor holding device of claim 5 wherein the bracket arms are formed from non-conductive material to reduce the possibility of electrocution due to contact with high voltage.

12. The high voltage tubing conductor holding device of claim 5 wherein the first and second shoes comprise, in combination: a first clamp member; a second clamp member; and means for removeably interconnecting the first and second clamp members together with the high voltage tubing conductor sandwiched therebetween.

13. The high voltage tubing conductor holding device of claim 12 wherein the first clamp member comprises, in combination: a generally C-shaped portion having a first end and a second end and having a diameter sufficient for receipt on the high voltage tubing conductor; first and second ears extending from the first and second ends of the C-shaped portion in opposite directions and along a straight line; and wherein the removeably interconnecting means comprises, in combination: bolts extending through the second clamp member and the first and second ears of the first clamp member.

14. The high voltage tubing conductor holding device of claim 13 wherein the shoe attaching means comprises, in combination: a hinge assembly formed on the shoe, with the hinge assembly including a bolt forming the shoe axis, wherein the shoe may be pivoted by loosening the bolt and rotating the shoe with respect to the second leg of the bracket arm about the bolt and the shoe may be fixed in one of the plurality of angular positions by tightening the bolt and preventing movement of the shoe with respect to the second leg of the bracket arm.

15. The high voltage tubing conductor holding device of claim 14 wherein the hinge assembly comprises, in combination: at least one plate extending from the C-shaped portion intermediate and in the opposite direction from its first and second ends, with the plate being parallel to and between the first and second ears, with the bolt extending through the plate and the second leg of the bracket arms.

16. Method for attaching a first high voltage tubing conductor with the attaching means attaching to a second high voltage tubing conductor, with the second high voltage tubing conductor having a sphere ball, comprising the steps of
  (a) providing a holding device including a first shoe for releasable securement to the first high voltage tubing conductor; a second shoe for releasable securement to the second high voltage tubing conductor; a first bracket arm including a first leg having a first end and a second end and a second leg having a first end and a second end, with the first ends of the first and second legs of the first bracket arm being interconnected; a second bracket arm including a first leg having a first end and a second end and a second leg having a first end and a second end, with the first ends of the first and second legs of the second bracket arm being interconnected, means for attaching the second ends of the first legs of the first and second bracket arms together with the first legs of the first and second bracket arms fixed in one of a plurality of angular positions between 90° and 270°, with the first and second bracket arms a generally U-shaped configuration, with the bracket arm axis of the angular positions of the first legs of the first and second bracket arms being spaced from the second legs of the first and second bracket arms and parallel to planes defined by the first and second legs of the first and second bracket arms, first and second means for attaching the first and second shoes with the second ends of the second legs of the first and second bracket arms in one of a plurality of angular positions, with the shoe axis of the angular positions of the first and second shoes being generally perpendicular with the planes defined by the first and second legs of the first and second bracket arms and generally perpendicular with the bracket arm axis;
  (b) arranging the first and second bracket arms of the holding device in the angular position between 90° and 270° desired for the first and second high voltage tubing conductors;
  (c) arranging the first shoe in the angular position with the second end of the second leg of the first bracket arm desired for the first high voltage tubing conductor;
  (d) arranging the second shoe in the angular position with the second end of the second leg of the second bracket arm desired for the second high voltage tubing conductor;
  (e) attaching the second shoe of the holding device to the second high voltage tubing conductor with the first and second bracket arms and the first and second shoes being in a generally parallel and complementary position to the desired angular position with the first and second high voltage tubing conductors;
  (f) positioning the first high voltage tubing conductor to abut with the sphere ball of the second high voltage tubing conductor;
  (g) attaching the first shoe of the holding device to the first high voltage tubing conductor; and
  (h) attaching the first high voltage tubing conductor to the sphere ball of the second high voltage tubing conductor.

* * * * *